(12) United States Patent
Wang

(10) Patent No.: US 12,318,924 B2
(45) Date of Patent: Jun. 3, 2025

(54) ROBOTIC ARM AND MODULARIZED SEGMENT

(71) Applicant: Haoxu Wang, Thornhill (CA)

(72) Inventor: Haoxu Wang, Thornhill (CA)

(*) Notice: Subject to any disclaimer, the term of this patent is extended or adjusted under 35 U.S.C. 154(b) by 0 days.

(21) Appl. No.: 18/528,999

(22) Filed: Dec. 5, 2023

(65) Prior Publication Data

US 2024/0208042 A1    Jun. 27, 2024

(30) Foreign Application Priority Data

Dec. 23, 2022  (CA) .................................. 3184938

(51) Int. Cl.
  *B25J 9/00*  (2006.01)
  *B25J 18/00*  (2006.01)
(52) U.S. Cl.
  CPC ............. *B25J 9/0009* (2013.01); *B25J 18/00* (2013.01)
(58) Field of Classification Search
  CPC .... A63H 33/084; A63H 33/088; A63H 33/08; A63H 33/067; A63H 33/062; A63H 33/06; A63H 33/042; A63H 33/04; A63H 33/003; B25J 9/08; B25J 9/12; B25J 9/0009; B25J 18/00

USPC ... 446/69, 90, 102, 104, 120, 121, 122, 124, 446/125; 403/3, 4; 74/490.05
See application file for complete search history.

(56) References Cited

U.S. PATENT DOCUMENTS

| | | | | |
|---|---|---|---|---|
| 4,109,398 A | * | 8/1978 | Hida ...................... | A63H 31/00 434/401 |
| 4,283,152 A | * | 8/1981 | Smith ..................... | F16B 7/048 403/3 |
| 4,813,903 A | * | 3/1989 | Furukawa ............ | A63H 33/042 446/104 |
| 4,864,795 A | * | 9/1989 | Burg ...................... | F16B 12/40 403/312 |

* cited by examiner

*Primary Examiner* — T. Scott Fix
(74) *Attorney, Agent, or Firm* — Westman, Champlin & Koehler, P.A.; Amanda M. Prose

(57) ABSTRACT

A segment for a robotic arm with a shaft having a first end and a second end; a first joint housing having a first recess and a second recess and a second joint housing having a first cavity and a second cavity, the first recess is engageable with the first cavity to form a first socket and the second recess is engageable with the second cavity to form a second socket, and the first socket is engageable with the first end of a shaft to facilitate movement along a longitudinal (roll) axis, and the second socket is engageable with a second end of the shaft to facilitate movement along a lateral (pitch) axis; a robotic arm having at least one of the segment described above.

11 Claims, 13 Drawing Sheets

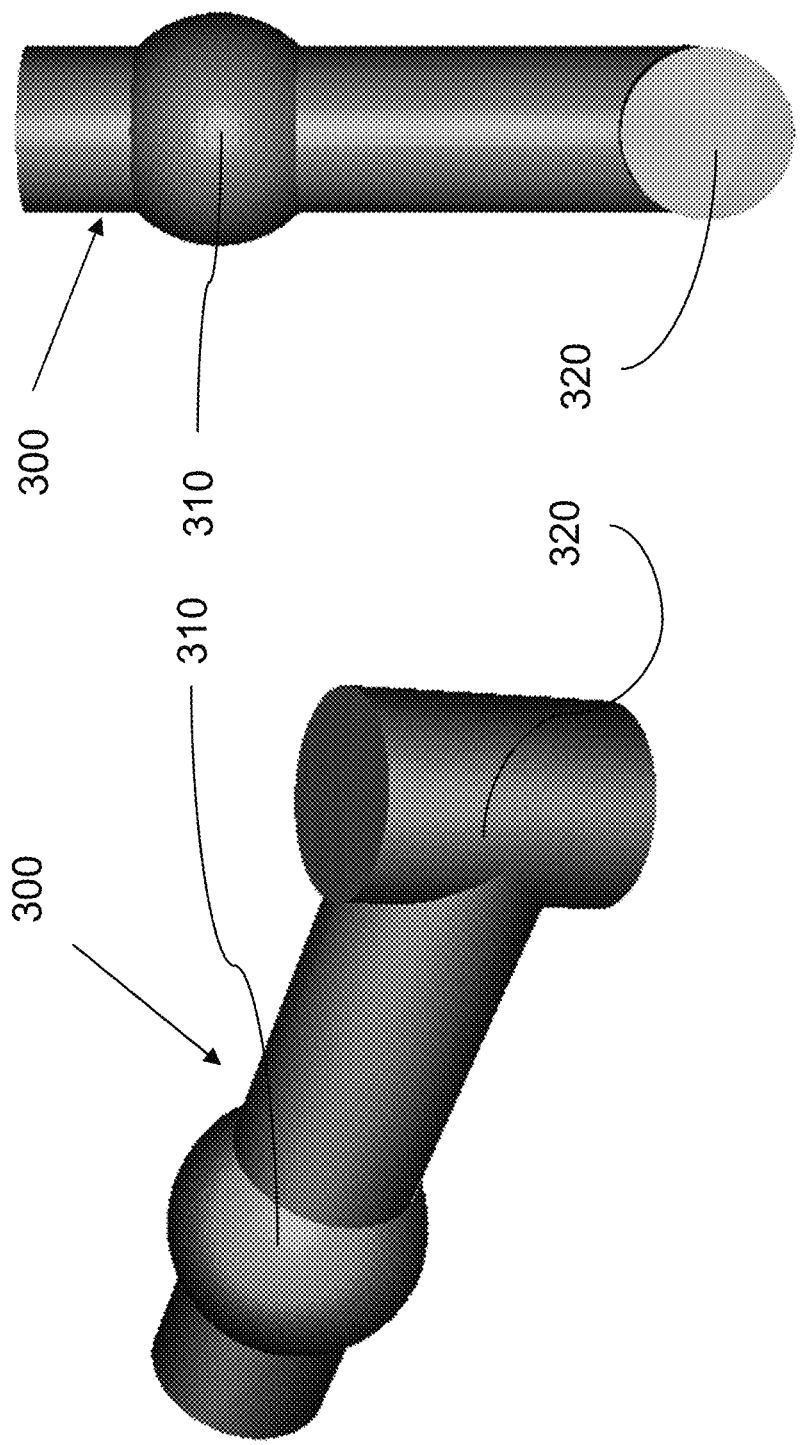

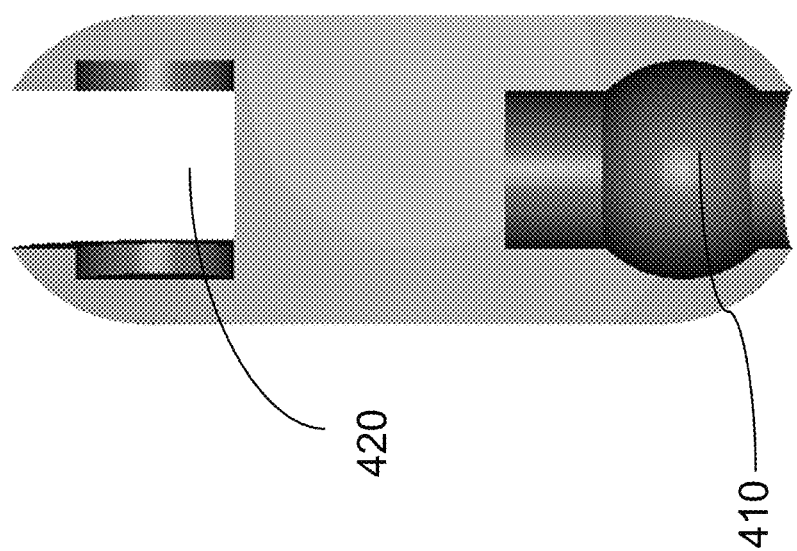
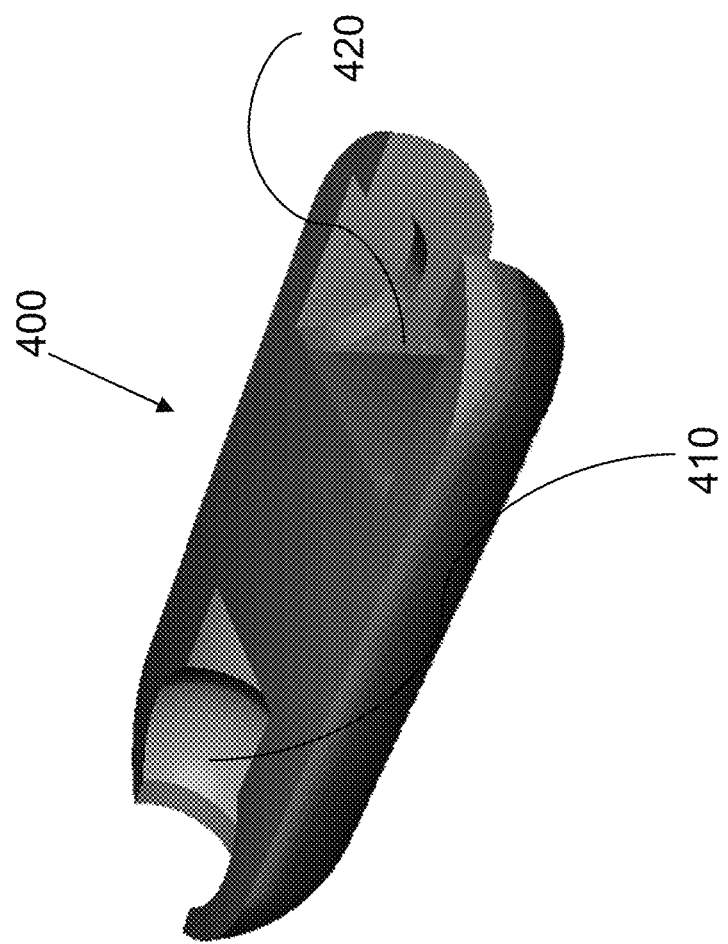
Fig. 4b
Fig. 4a

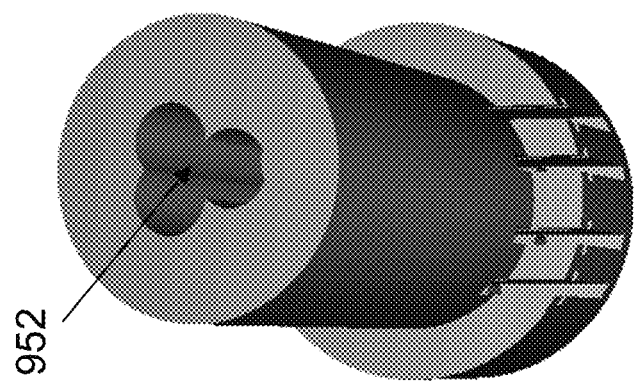
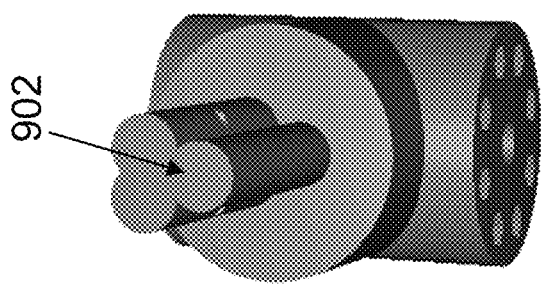
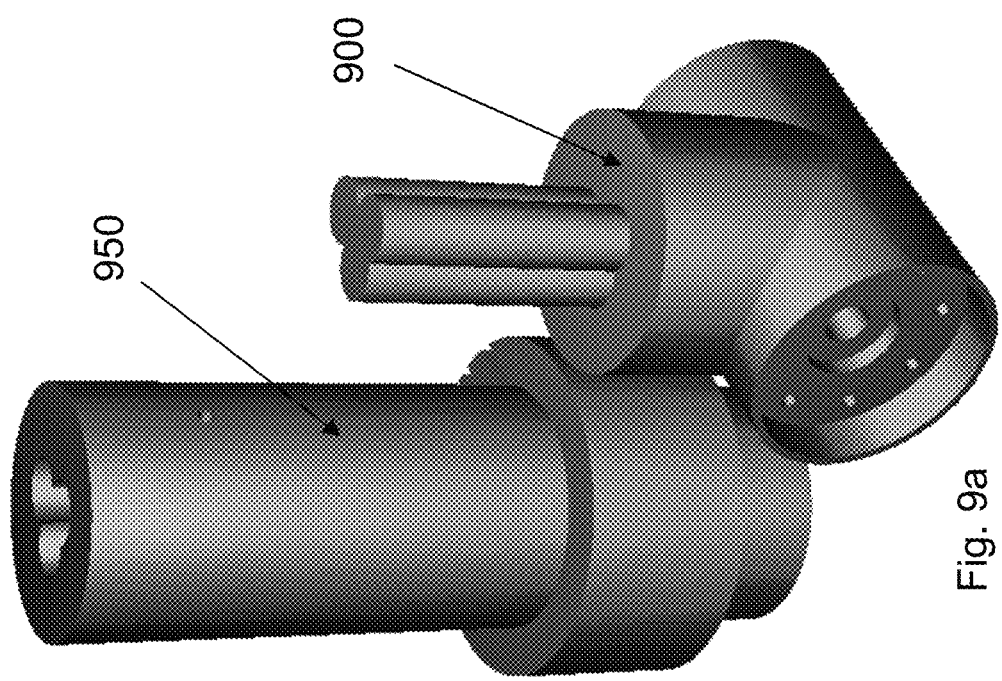
Fig. 9a
Fig. 9b

ROBOTIC ARM AND MODULARIZED SEGMENT

CROSS-REFERENCE TO RELATED APPLICATION

The present application claims priority of Canadian patent application Serial No. 3,184,938, filed Dec. 23, 2022, the content of which is hereby incorporated by reference in its entirety.

TECHNICAL FIELD

The present disclosure relates to robotic arms and parts thereof.

BACKGROUND

Existing general-purpose high Degree of Freedom (DoF) robotic arms are usually assembled by a large number of small, complex and distinct parts, which usually requires commercial infrastructures to manufacture.

Those limitations often lead to hard-coded design, which is infeasible to be customized for particular use-cases, and difficult to assemble, repair and modify. Thus these arms may be prohibitively expensive for personal or educational usage.

SUMMARY

What is disclosed is a segment for a robotic arm. The modularized design allows for different configurations (i.e. versions or builds) to be customized for various use-cases.

The robotic arm can be built by one or many segments, each capable of performing both Roll (X axis) and Pitch (Y axis) rotations. One may use a one-segment arm for a sun-tracking smart solar panel, or a many-segments arm for a snake-mimicking robot.

The segment for a robotic arm includes a shaft having a first end and a second end; a first joint housing having a first recess and a second recess and a second joint housing having a first cavity and a second cavity. The first recess is engageable with the first cavity to form a first socket and the second recess is engageable with the second cavity to form a second socket. The first socket is engageable with the first end of a shaft to facilitate movement along a longitudinal (roll) axis, and the second socket is engageable with a second end of the shaft to facilitate movement along a lateral (pitch) axis.

In some embodiments, any one of the first joint housing, first recess or second recess may be dimensionally similar to the second joint housing, first cavity or second cavity, respectively.

In other embodiments, there may be a first actuator for rotating the shaft along a longitudinal axis and a second actuator for rotating the shaft along a lateral axis.

According to another embodiment, there is provided a robotic arm comprising at least one of the segments described above. In other embodiments, the number of segments may be two, three, or four or more.

The foregoing summary is not intended to summarize each potential embodiment or every aspect of the subject matter of the present disclosure.

These and other aspects of the device and method are set out in the claims, which are incorporated here by reference.

BRIEF DESCRIPTION OF THE DRAWINGS

All figures of the present disclosure illustrate exemplary, non-limiting embodiments. Embodiments will now be described with reference to the figures, in which like reference characters denote like elements, by way of example, and in which:

FIG. 3a is a perspective view of a shaft for a robotic arm segment, according to another embodiment.

FIG. 3b is a top plan view of the shaft of FIG. 3a.

FIG. 4a is a perspective view of a first joint housing for a robotic arm segment, according to another embodiment.

FIG. 4b is a top plan view of the half socket of FIG. 4a.

FIG. 5b is a top plan view of the shaft of FIG. 5a.

FIG. 6b is a top plan view of the first joint housing of FIG. 6a.

FIG. 7a is a perspective view of a second joint housing, according to the embodiment of FIG. 6a.

FIG. 7b is a top plan view of the second joint housing of FIG. 7a.

FIG. 8b is a top plan view of the parts of FIG. 8a.

FIG. 9a is a perspective view of a detachable shaft, according to another embodiment.

FIG. 9b is another perspective view of the detachable shaft of FIG. 9a.

FIG. 14b is a side view of the end effector of FIG. 14a.

DETAILED DESCRIPTION

The present disclosure will now be described, by way of example only, with reference to the accompanying drawings. Immaterial modifications may be made to the embodiments described here without departing from what is covered by the claims.

Figure 1:
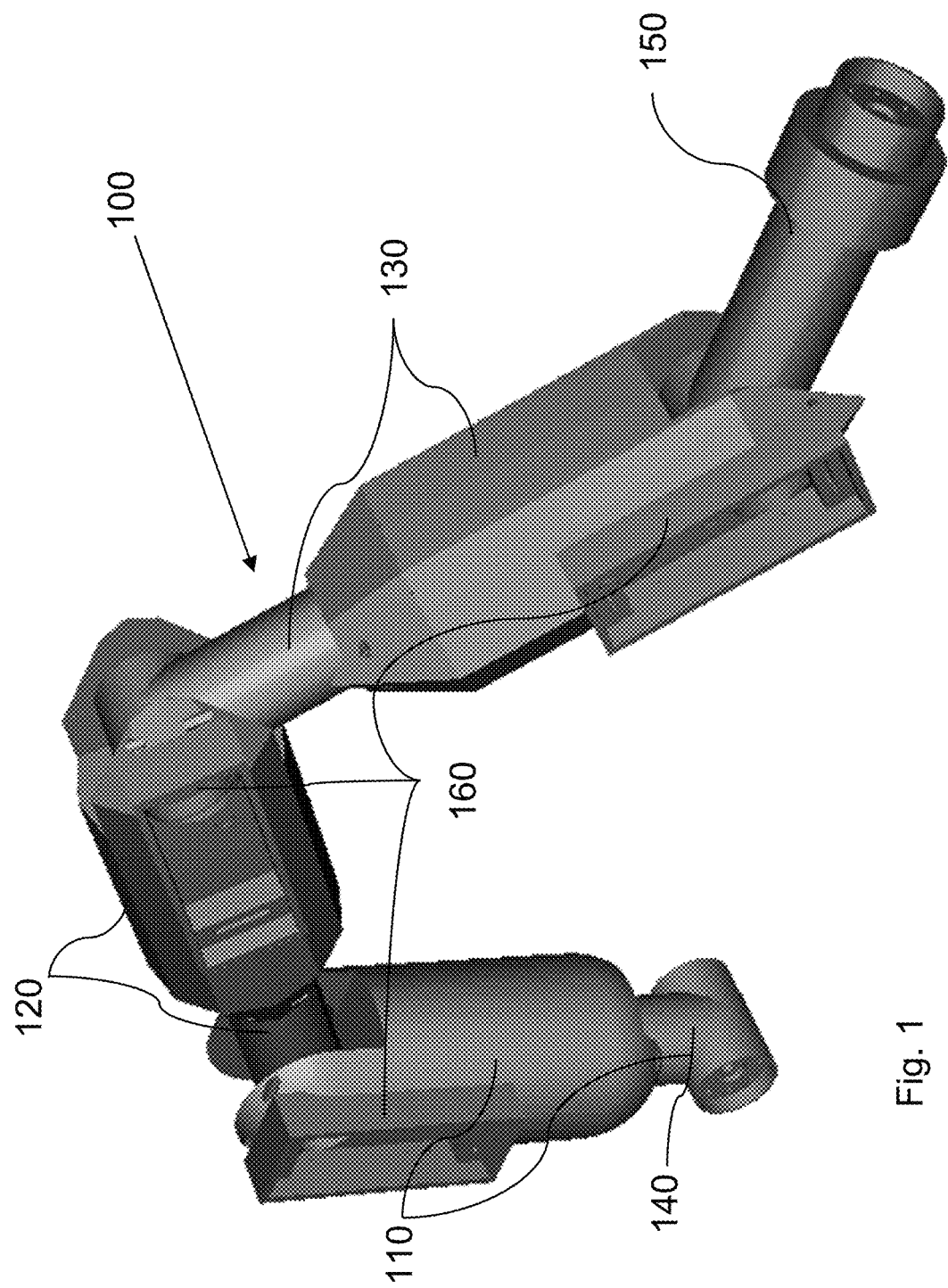
FIG. 1 is a perspective view of a robotic arm having three segments, according to one embodiment.

FIG. 1 shows a three-segment configuration robotic arm 100, consisting of segments 110, 120, 130. The bottom end of shaft 140 may be used to secure the arm to a foundation, while the top end of shaft 150 may be connected to an end-effector, or vice versa. Each segment may have extension structures 160, which can be used to secure actuators.

Although each segment may have different configurations such as actuator geometry, the length of shaft or exterior shapes of joints may benefit from sharing a common connection-interface between the joints and shafts. Because of this, each of the segments 110, 120, and 130 can be rearranged in any order.

Figure 2:
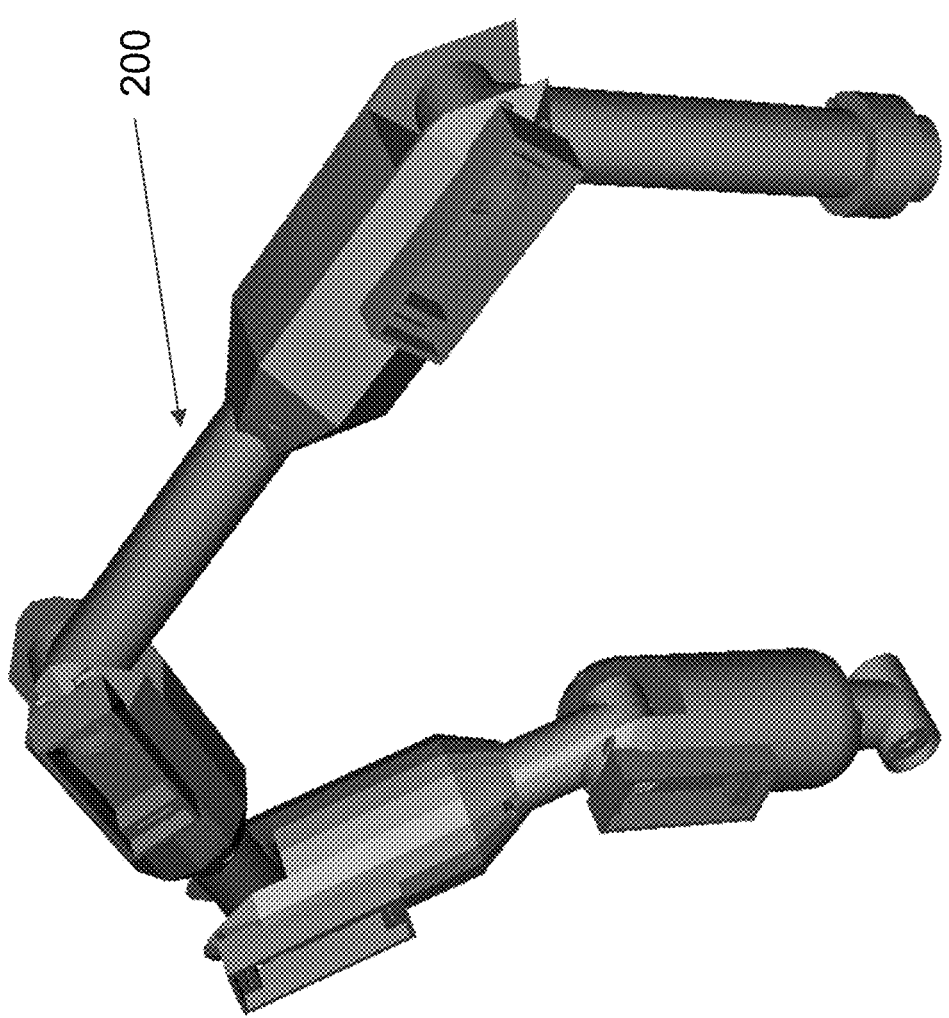
FIG. 2 is a perspective view of a robotic arm having a four segments, according to another embodiment

FIG. 2 shows a four-segment robotic arm 200. Compared to arm 100, while both having 6-DoF, this configuration has longer reach, and allows for more flexibility.

FIG. 3a and FIG. 3b show a shaft 300 from a perspective and top-plan view, respectively. At a first end of shaft 300, there is a sphere shaped structure 310 which can function as a bearing to restrict translation motion while allowing rotation in a longitudinal axis (also known as roll). At a second end of shaft 300, there is a cylinder shaped structure 320 which functions as a bearing for rotation along a lateral axis (also known as pitch).

FIG. 4a and FIG. 4b show a first joint housing 400 from a perspective and top-plan view, respectively. The first joint housing has a first recess 410 and a second recess 420 which partially match the geometry of the sphere shaped structure 310 and cylinder shaped structure 320 from FIG. 3a and FIG. 3b.

The first joint housing 400 may comprise one half or a portion of a full joint unit. There may be a second joint housing (not shown) having mirroring or substantially similar dimensions and shape as that of the first joint housing, having first and second cavities on opposed ends that correspond to the first and second recesses on the first joint housing, with the first cavity being dimensionally similar to the first recess, and the second cavity being dimensionally similar to the second recess.

The first joint housing and second joint housing may be combined such that the first recess of the first joint housing and the first cavity of the second joint housing form a first socket, and the second recess of the first joint housing and the second cavity of the second joint housing form a second socket. The first socket may be used to house the sphere-shaped structure 310 of the shaft in FIGS. 3a and 3b to allow for movement in a roll axis, and the second socket may be used to house the cylinder shaped structure 320 of the shaft in FIGS. 3a and 3b to allow movement along a pitch axis.

The enclosure of the first joint housing and the second joint housing around the shaft may also prevent the shaft from dislocating from the joint, while allowing movement.

The shape and dimensions of the joint and shafts may vary. For example, in the illustrated embodiment shown in FIGS. 4a and 4b, the cross section of the joint 400 is round, resulting in a round exterior. In other embodiments, the exterior can take any shape, such as the hexagonal shaped segments shown in FIG. 2.

FIGS. 5a and 5b, FIGS. 6a and 6b, and FIGS. 7a and 7b illustrate alternative embodiments, which may be variations on the designs from FIGS. 3a and 3b, and FIGS. 4a and 4b.

These embodiments may be adapted to work with real-world hardware. In the embodiments shown throughout this disclosure, the actuator holders are configured to fit DS5160/5180/51150 servo motors. In some embodiments, actuators can be of other specifications, such as SG90, MG90s, or other types, such as stepper or hydraulic motors. In those cases, geometry of the holders may change accordingly, along with optional supporting structures.

Figure 5B:
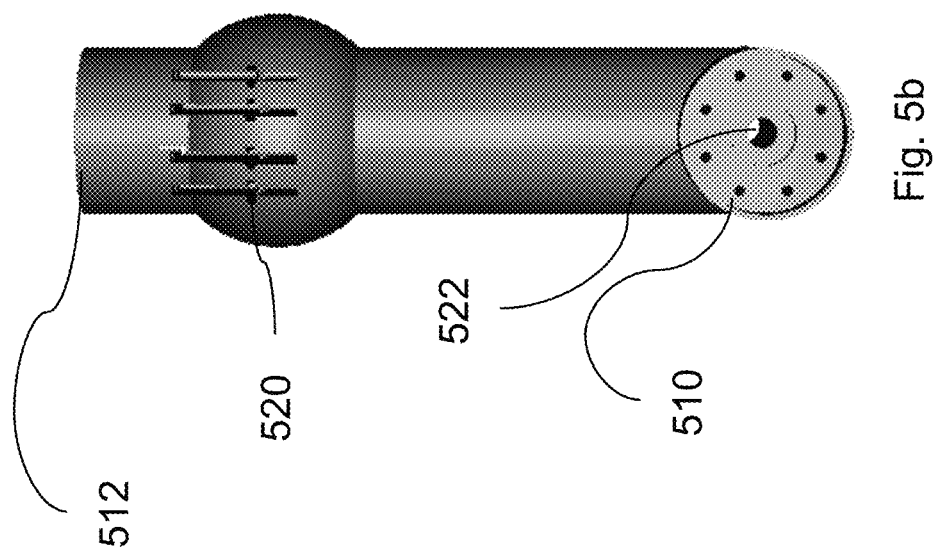
Figure 5A:
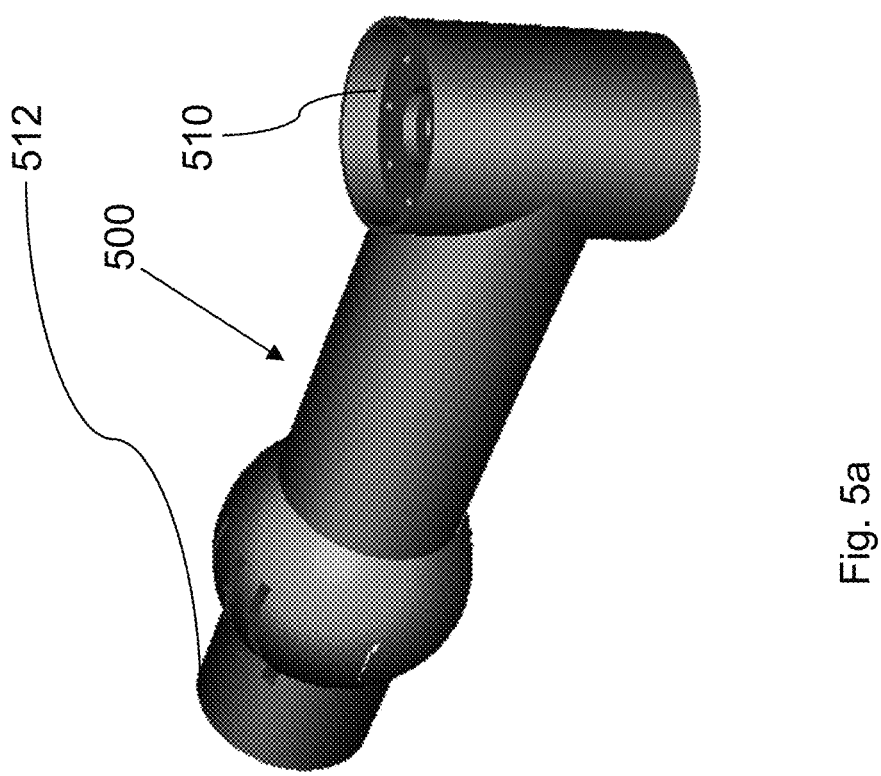
FIG. 5a is a perspective view of a shaft, according to another embodiment
Figure 8B:
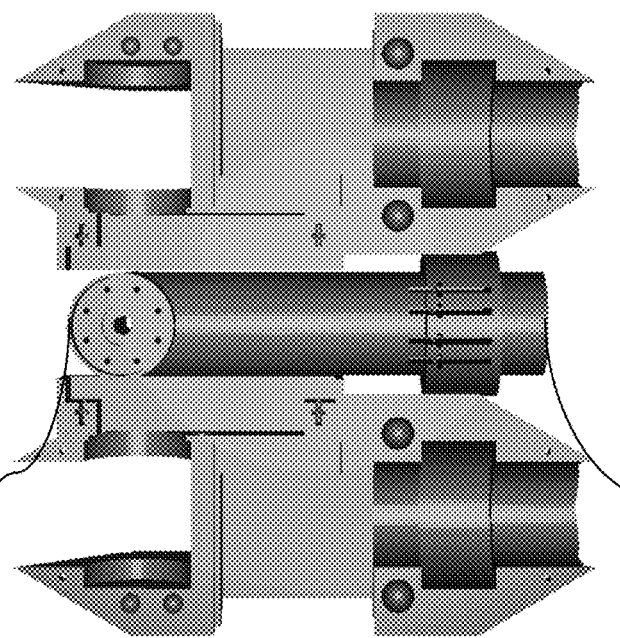
Figure 8A:
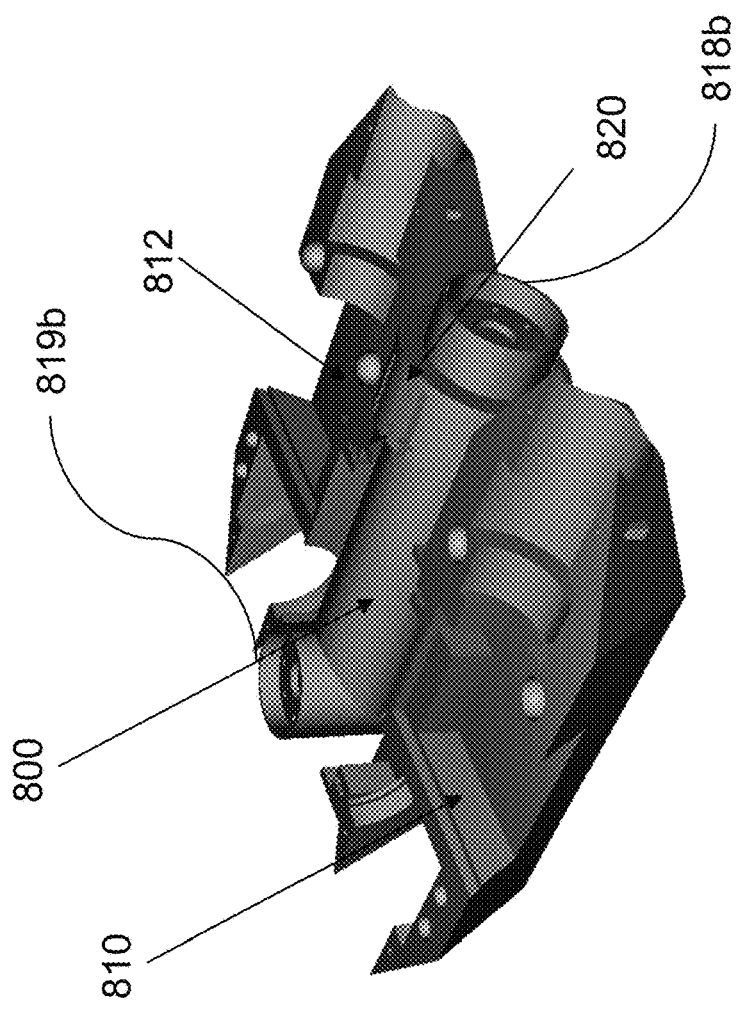
FIG. 8a is a perspective view of the parts of a segment arranged for 3D printing, according to another embodiment.

FIG. 5a and FIG. 5b show shaft 500 according to another embodiment. On the pitch-side, a portion of the shaft 500 is hollowed out, creating a holder 510 to mount a Pitch-side servo motor. Similarly, holder 512 could be used to mount an actuator for Roll. 818b and 819b in FIGS. 8a and 8b shows holders having a similar design.

When manufacturing using 3D printers, supporting structure is often required to print overhanging structures. Optionally, to mitigate the labor intensive removal process of supporting materials, the four lots 520 are included optional openings to make 3D printing and installation easier. For example, they may reduce the supporting materials needed by the bolt sockets of couplings or horn discs. The opening tunnel 522 can be used to insert screwdrivers when installing shaft bolts.

Figure 6B:
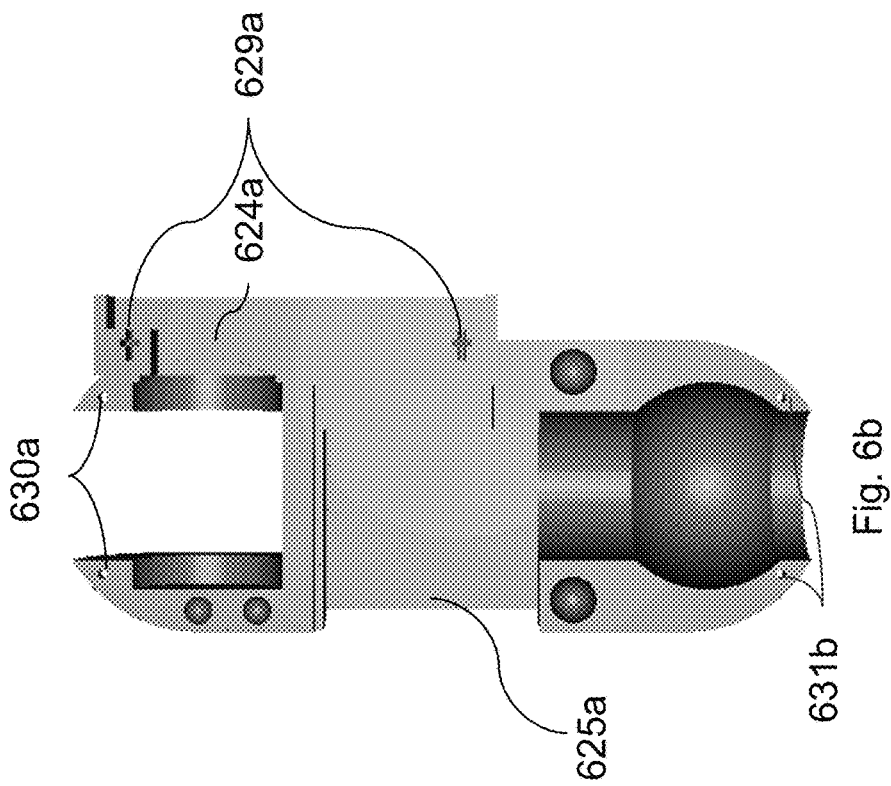
Figure 6A:
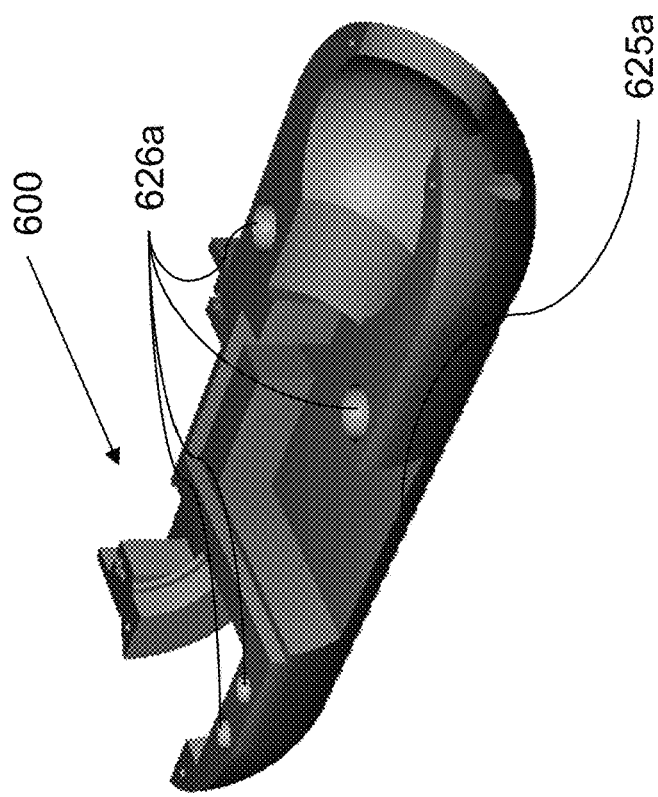
FIG. 6a is a perspective view of a first joint housing, according to another embodiment.

FIG. 6a and FIG. 6b show perspective and top plan views of a first joint housing 600, according to yet another embodiment. The structure 624a extends outwards and can be used for mounting a Pitch actuator. The hollowed structure 625a can be used for mounting a Roll actuator.

Figure 7B:
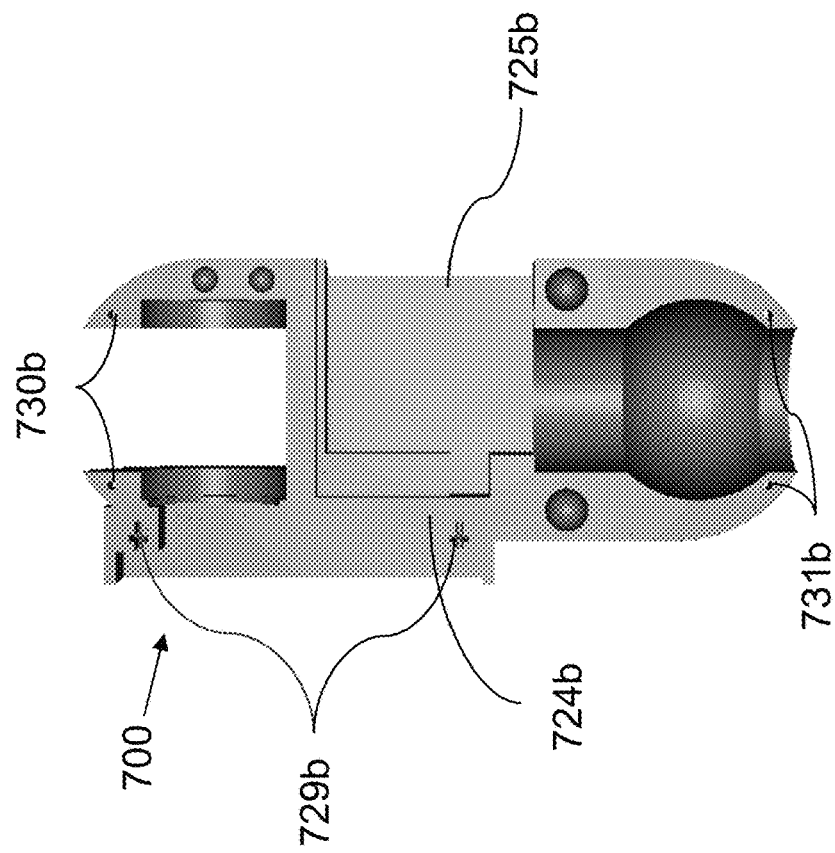
Figure 7A:
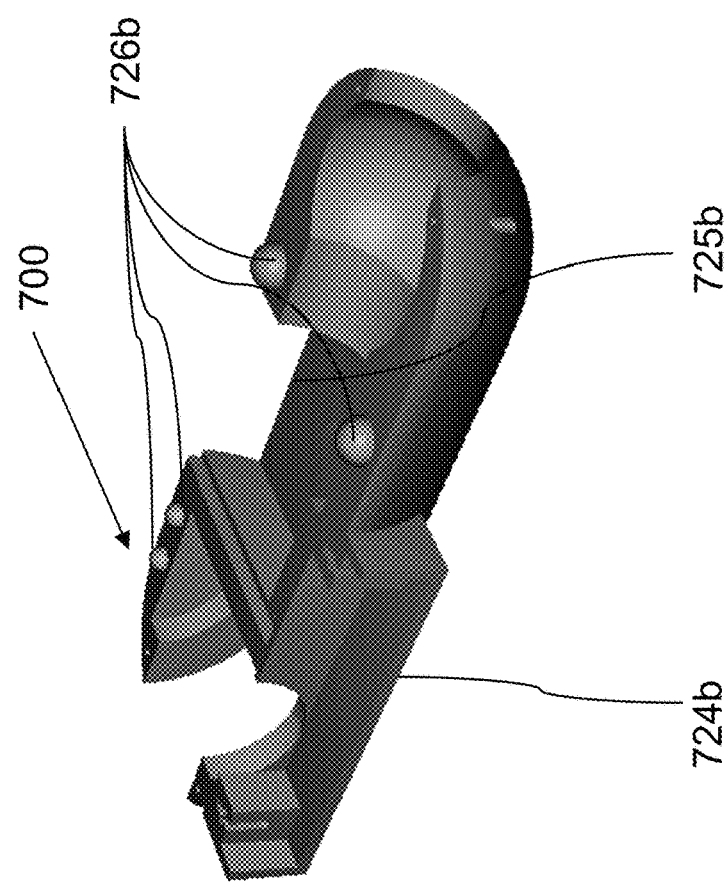

FIG. 7a and FIG. 7b show the other second joint housing 700. The structures 724b and 725b of second joint housing 700 mirror 624a and 625a of first joint housing 600 from FIGS. 6a and 6b. When assembled together, the structures can be used for mounting actuators to the joint. In this embodiment, the servo's body may be secured to the joint using bolts and nuts using sockets 629a and 729b, while the bottom of the servo's body is exposed. In some embodiments, structures may fully enclose actuators and wirings, so that the robotic arm is water resistant.

To build a segment, the two joint housings 600 and 700 can be used to enclose a shaft (for example, shaft 300 as shown in FIG. 3 or shaft 500 as shown in FIG. 5) at one or both ends, by connecting joint-Roll to shaft-Roll and joint-Pitch to shaft-Pitch. In this exemplary embodiment, four pairs of concave placeholders 626a and convex placeholders 726b were created to prevent the two joint housings from sliding. Meanwhile, the two joint housings can be secured together by installing bolts and nuts in holder pairs of 630a to 730b and 631a to 731b. In some embodiments, the half-joints can be secured using other methods, such as latches, screws or soldering.

In some embodiments, one or both actuators and their holders may be omitted, and the joint would be fixed against the corresponding shafts, potentially reducing weight and cost with potentially reduced functionality.

Parts from any of FIGS. 5a, 5b, 6a, 6c, 7a and 7c can be assembled together into a segment, to replace any of segments 110, 120, 130 from FIG. 1.

FIGS. 8A and 8B shows another embodiment of a segment having three parts. Instead of the sphere-shaped bearing 310 from FIGS. 3A and 3B, a cylinder 820 may be used. The three parts consist of a shaft 800 flanked by two joint housings 810 and 812. The three parts are placed side by side, arranged in directions where most hollow spaces are facing upwards, which may facilitate 3D printing in that the three parts can be printed together. As previously discussed above, 818b and 819b show areas within the shaft 800 that can be used to mount actuators.

In some embodiments, a shaft may also be manufactured as two corresponding parts, being detachable or separable within the section between the two ends, then assembled together using methods such as latches or screws, or using corresponding plug-aperture configuration on each end. This may be used to facilitate ad-hoc assembly of segments. An example of this embodiment is shown in FIG. 9a and FIG. 9b, with a first shaft portion 900 being joinable to a second shaft portion 950 to form a full shaft. The plug 902 of first shaft portion 900 can be used to securely engage the aperture 952 found on the second shaft portion 950.

Figure 10B:
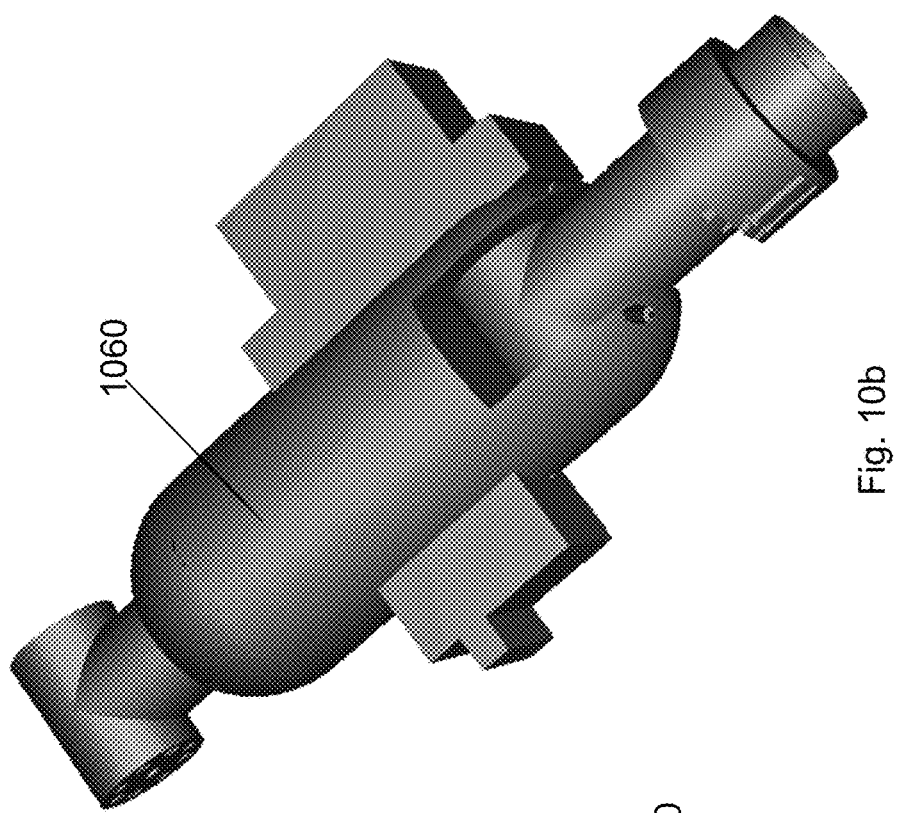
FIG. 10b is a perspective view of the segment of FIG. 10a, with a second joint housing attached.
Figure 10A:
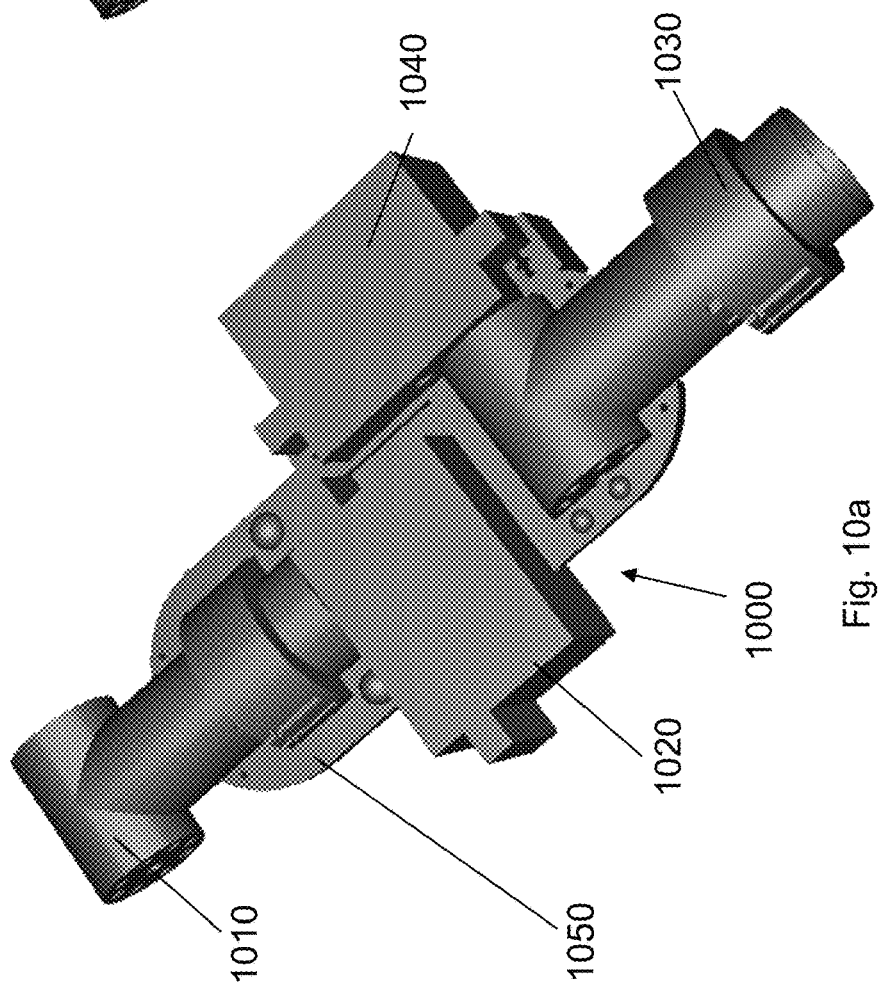
FIG. 10a is a perspective view of a segment without a second joint housing, according to another embodiment.

FIGS. 10a and 10b show an assembled segment 1000 with two actuators or motors. In FIG. 10a, shafts 1010 and 1020, and motors 1030 and 1040 are mounted within a first joint housing 1050. In FIG. 10b, a second joint housing 1060 is used to enclose the shafts 1010 and 1020 to complete the segment. Multiple nuts and bolts may be used to join first joint housing 1050 to second joint housing 1060.

Figure 12:
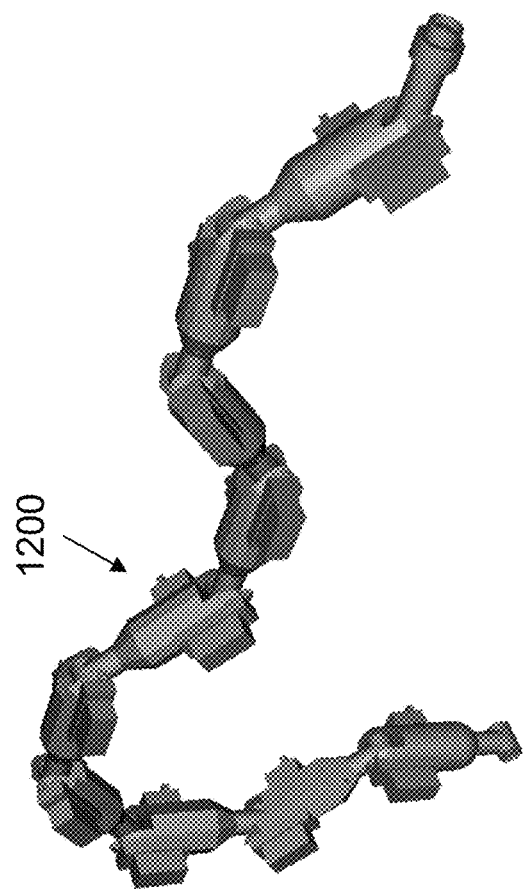
FIG. 12 is a perspective view of a robotic arm having ten segments, according to another embodiment.
Figure 11:
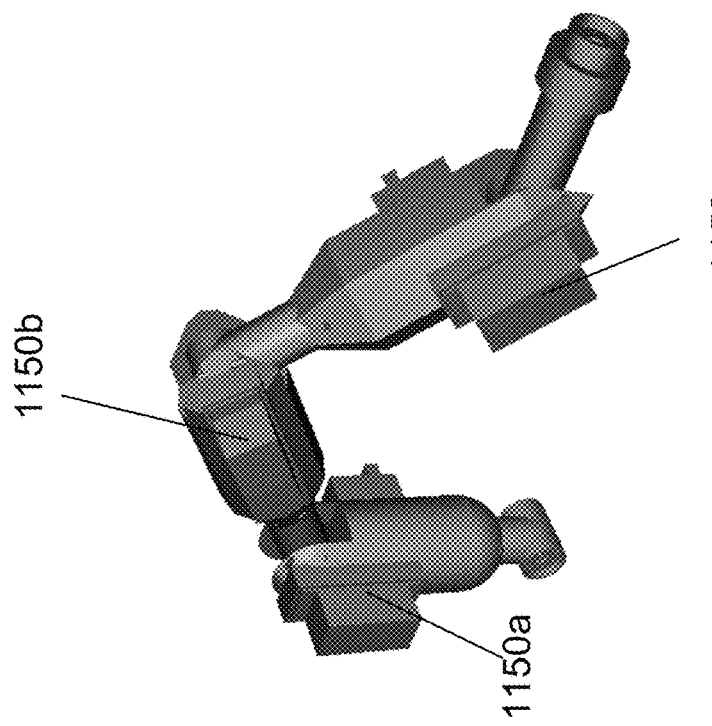
FIG. 11 is a perspective view of a robotic arm having three segments, according to another embodiment.
Figure 13:
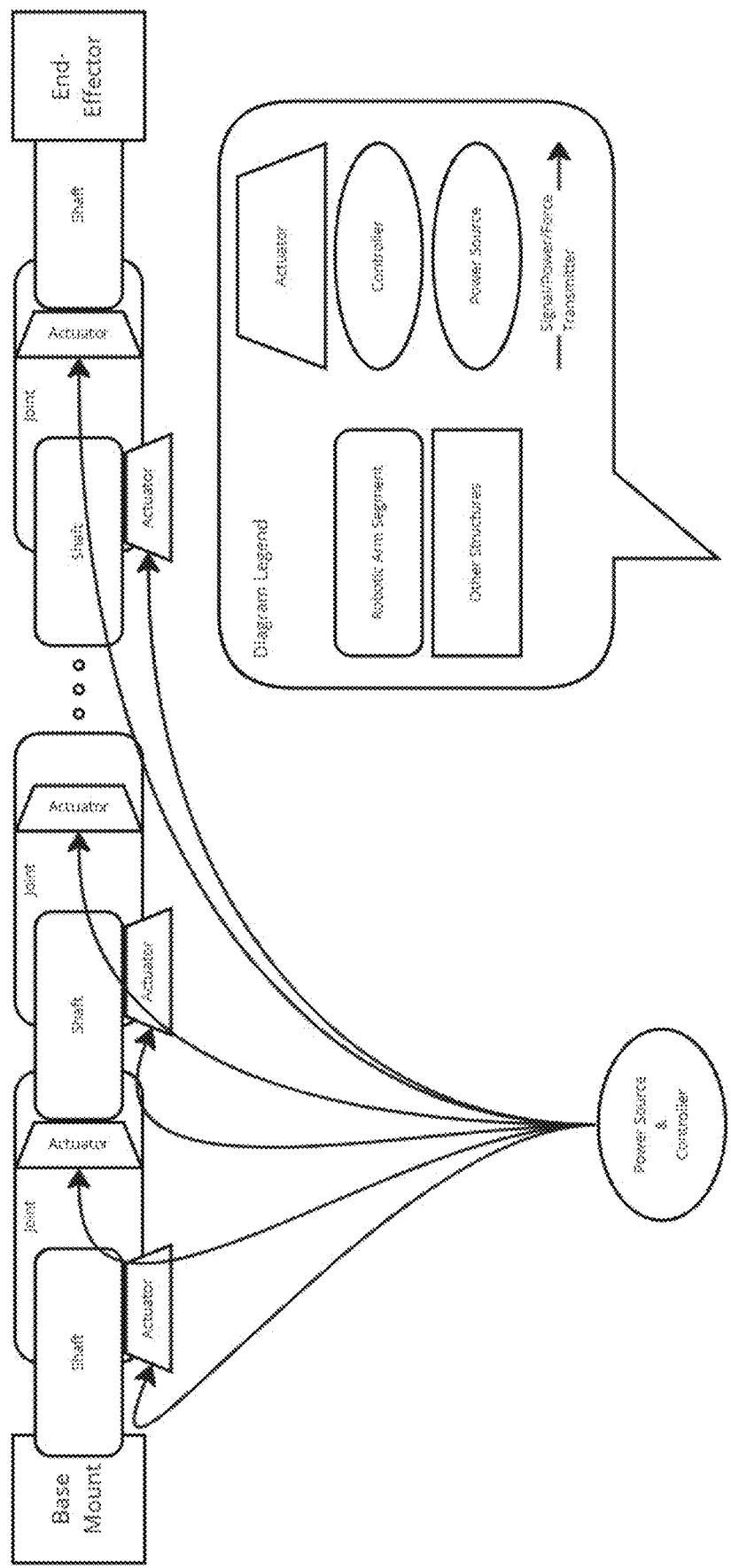
FIG. 13 is a schematic diagram of a robotic arm, according to another embodiment.

FIG. 11 shows an embodiment of a robotic arm 1100 having three segments installed with actuators such as dummy servo motors 1150a, b and c. installed. FIG. 12 shows another embodiment of a robotic arm 1200 having 10 segments, also with actuators installed throughout.

FIG. 12 shows a schematic diagram of a multi-segment robotic arm. For embodiments that use servo actuators, the power source may be a DC power supply, while power/signal transmitters can be jumper cables. For other embodiments that uses hydraulic actuators, the power source could be a hydraulic pump, while the transmitters can be pipes. The controller can be software deployed to computers, such as cloud servers, desktop, raspberry pi, arduino, or other system-on-a-chip (SoC). At each end of the robotic arm may be other structures such as a base mount or end-effector.

Figure 14B:
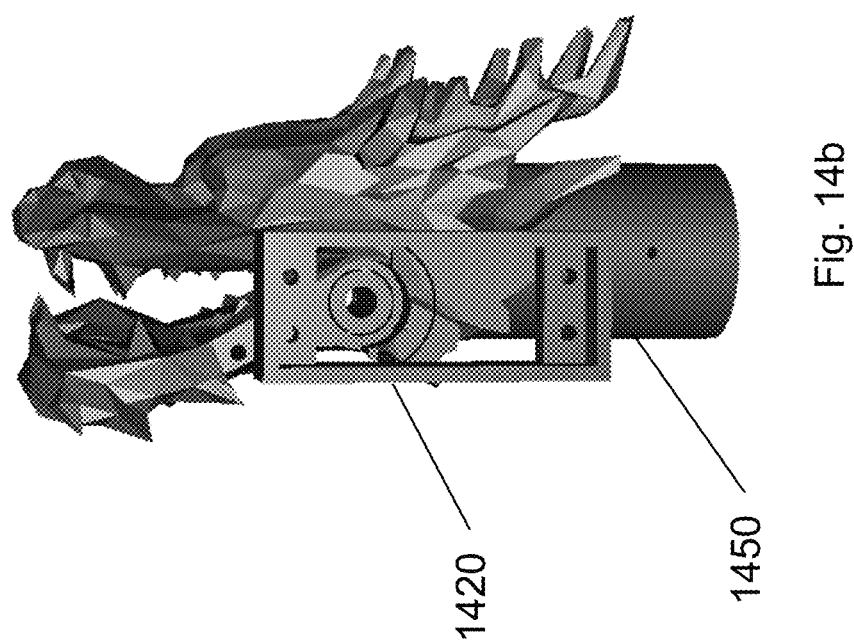
Figure 14A:
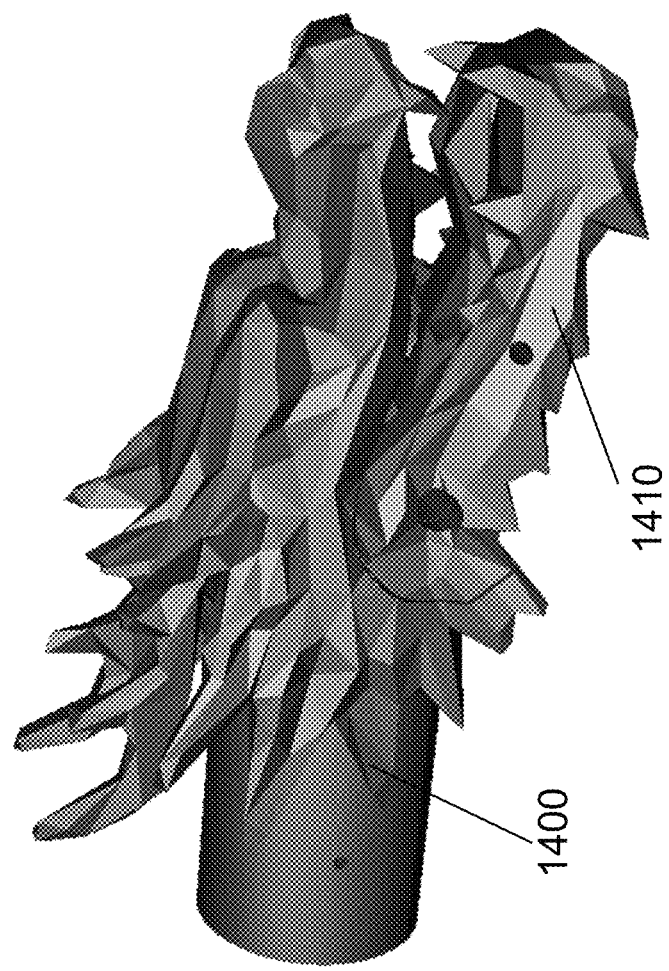
FIG. 14a is a perspective view of an end effector, according to another embodiment.

FIG. 14a and FIG. 14b show a gripper (end-effector) 1400 decorated as a dragon head, which has a rotatable jaw 1410. The gripper can be manufactured as one whole 3D printing model. The jaw may be mounted with a servo motor 1420, and other end 1450 of the gripper may be connected to a detachable or separable shaft.

One end of a shaft may leverage its geometry to function as a bearing for performing Roll, while the other end for Pitch. The two ends of a joint may have sockets of the matching geometry for receiving the shafts, optionally, with lubrication or smaller bearings. In the most basic form, this geometry can be a cylinder or sphere. Multiple segments can then be chained together by connecting joint-Roll to shaft-Roll and joint-Pitch to shaft-Pitch.

Instead of using pulleys and belts to transmit force, actuators have their main bodies directly mounted on joints, while their shaft or coupling may be mounted on shafts of the robotic arms.

Meanwhile each segment may be configured independently to meet various functional requirements, for example, depending on the desired reach, weight, torque, actuator specifications, joints and shafts can be customized with a suitable length, material composition, density, diameter, exterior-shape, actuator socket shape, and so on.

Therefore a 6-DoF robotic arm can be built using 3 interchangeable segments, each built by two half-joints and one shaft, assembled together using commonly available hardware, such as standardized bolts and motors.

In some embodiments, additional augmentation may be introduced, for instance, structures to secure wiring, tunnels to inject lubrication, placeholders, sockets for screws, bolts, bearings, hinges, latches or reinforcing rods.

In other embodiments, both joint housings and shafts can be cut into multiple sections, each manufactured separately, then assembled together. Those sections may be manufactured together with foundation or end-effectors as one whole object.

In other embodiments, additional actuators may be placed in positions mirroring the first and second actuators, providing larger torque and balancing the weight distribution. Holders for the additional actuators may be added to the mirroring position of the joint accordingly.

Likewise, unless otherwise stated herein, certain components of the assembly may be manufactured and/or molded together in a unitary one-piece construction and/or may be manufactured and/or molded apart from one another in multiple pieces for subsequent assembly with one another.

The foregoing description has been presented for the purpose of illustration and is not intended to be exhaustive or to limit the invention to the precise form disclosed.

In the claims, the word "comprising" is used in its inclusive sense and does not exclude other elements being present. The indefinite articles "a" and "an" before a claim feature do not exclude more than one of the features being present. Each one of the individual features described here may be used in one or more embodiments and is not, by virtue only of being described here, to be construed as essential to all embodiments as defined by the claims.

What is claimed is:

1. A segment for a robotic arm comprising:
   a shaft having a first end and a second end, wherein the first end and the second end have different dimensions and wherein the second end is positioned transverse to an axis of the shaft;
   a first joint housing having a first recess, a second recess, a third recess and a fourth recess;
   a second joint housing having a first cavity, a second cavity, a third cavity and a fourth cavity;
   a first actuator for rotating the shaft along a roll axis and a second actuator for rotating the shaft along a pitch axis,
   whereby the first recess is engageable with the first cavity to form a first socket, and the second recess is engageable with the second cavity to form a second socket;
   the first socket is engageable with the first end of the shaft to facilitate movement in a roll axis, and the second socket is engageable with the second end of the shaft to facilitate movement along a pitch axis; and
   whereby the third recess and third cavity are engageable to house the first actuator, and
   whereby the fourth recess and fourth cavity are engageable to house the second actuator.

2. The segment of claim 1, wherein the first joint housing is dimensionally similar to the second joint housing.

3. The segment of claim 1, wherein the first recess is dimensionally similar to the first cavity and the second recess is dimensionally similar to the second cavity.

4. The segment of claim 1, wherein the shaft comprises a first shaft portion in connection with a second shaft portion.

5. The segment of claim 1, further comprising an end effector in connection with the shaft.

6. The segment of claim 1, further comprising a third actuator in connection with the end effector.

7. The segment of claim 1, wherein the first end of the shaft comprises an indentation for receiving the first actuator.

8. A robotic arm comprising at least one segment, each segment further comprising:
   a shaft having a first end and a second end wherein the first end comprises a sphere and the second end comprises a cylinder offset in orientation from an axis of a length of the shaft;
   a first joint housing having a first recess and a second recess;
   a second joint housing having a first cavity and a second cavity,
   whereby the first recess is engageable with the first cavity to form a first socket and the second recess is engageable with the second cavity to form a second socket; and
   the first socket is engageable with the first end of the shaft to facilitate movement in a roll axis, and the second socket is engageable with the second end of the shaft to facilitate movement along a pitch axis.

9. The robotic arm of claim 8, wherein the number of segments is two.

10. The robotic arm of claim 8, wherein the number of segments is three.

11. The robotic arm of claim 8, wherein the number of segments is at least four.

\* \* \* \* \*